(12) United States Patent
Trujillo

(10) Patent No.: US 9,121,927 B2
(45) Date of Patent: Sep. 1, 2015

(54) ACOUSTIC ABSOLUTE POSITION ENCODER AND METHOD

(75) Inventor: Salomon J. Trujillo, Redwood City, CA (US)

(73) Assignee: QBotix, Inc., Menlo Park, CA (US)

( * ) Notice: Subject to any disclaimer, the term of this patent is extended or adjusted under 35 U.S.C. 154(b) by 562 days.

(21) Appl. No.: 13/483,022

(22) Filed: May 29, 2012

(65) Prior Publication Data

US 2013/0322213 A1    Dec. 5, 2013

(51) Int. Cl.
*G01S 3/80* (2006.01)
*G01S 1/76* (2006.01)

(52) U.S. Cl.
CPC ........................................ *G01S 1/76* (2013.01)

(58) Field of Classification Search
CPC .......................................................... G01S 3/80
USPC .......................................................... 367/118
See application file for complete search history.

(56) References Cited

U.S. PATENT DOCUMENTS

| | | | |
|---|---|---|---|
| 450,257 | A | 4/1891 | Schilling |
| 1,745,714 | A | 2/1930 | Reynolds et al. |
| 2,568,995 | A | 9/1951 | Eckhardt |
| 3,220,295 | A | 11/1965 | Griffin |
| 3,335,490 | A | 8/1967 | Warner |
| 4,931,949 | A | 6/1990 | Hernandez et al. |
| 5,279,477 | A | 1/1994 | Yoshikawa |
| 5,497,581 | A | 3/1996 | Williams |
| 6,736,086 | B2 | 5/2004 | Kaiser et al. |
| 2011/0041669 | A1 | 2/2011 | Hermanson et al. |
| 2011/0294096 | A1 | 12/2011 | deCastro et al. |
| 2013/0257592 | A1* | 10/2013 | Johnson et al. ................ 340/6.1 |
| 2013/0322213 | A1* | 12/2013 | Trujillo ......................... 367/118 |

FOREIGN PATENT DOCUMENTS

EP    1 306 991 A1    5/2003

OTHER PUBLICATIONS

Kokossalakis, "Acoustic data communication system for in-pipe wireless sensor networks", Thesis, MIT, 2006, Dept. of Civil and Env. Eng.

Choy et al., "Quantification of Gear Tooth Damage . . .", Int. Journal of Rotating Machinery, 1997, p. 143-151, vol. 3, No. 3, OPA, Amsterdam.

Forrest, "Measured dynamics of a thin cylindrical shell subject to axial excitation", Proceedings of Acoustics, Nov. 2005, p. 61-66, Australia.

Koga, Tetsuzo., "Free Vibrations of Circular Cylindrical Shells", http://www.geocities.co.jp/SiliconValley-Bay/1245, p. 1-20, 2008.

(Continued)

*Primary Examiner* — Daniel Pihulic
(74) *Attorney, Agent, or Firm* — Mark Alboszta

(57) ABSTRACT

The present invention teaches acoustic absolute position encoders and methods for deploying the same. The encoder has a moving member with a mechanical contacting portion, and a stationary member associated with the moving member. Reed elements are mounted on the stationary member such that they are mechanically engaged by the contacting portion of the moving member as the latter moves linearly or rotates. The reed elements generate sound tones in response to transient contact with the contacting portion. A receiver receives the tones and an acoustic processing circuit determines the absolute position of the moving member based on the sound tones.

18 Claims, 8 Drawing Sheets

(56) References Cited

OTHER PUBLICATIONS

Kokossakis, "Acoustic data communication system for in-pipe wireless sensor networks", Thesis, MIT, 2006, Dept. of Civil and Env. Engineering.

Li, Shi-Rong et al., "Free vibration of three-layer circular cylindrical . . . ", Mechanics Research Communications 37 (2010), p. 577-580, Elsevier.

Polastre et al., "LOUD: An Immersive Music Exploration System", Technical report, 2002, University of California, Berkeley.

Ramamurti et al., "Free vibrations of circular cylindrical shells", Journal of Sound and Vibration, Sep. 1976, p. 137-155, vol. 48, Issue 1.

Vold et al., "Multi Axle Order Tracking with the Vold-Kalman Tracking Filter", Time, 1997, p. 30-34, May 31.

\* cited by examiner 8-bit Gray Codes

```
138A - 0 0 0
138B - 0 0 1
138C - 0 1 1
138D - 0 1 0
138E - 0 1 1
138F - 1 1 1
138G - 1 0 1
138H - 1 0 0
```

ACOUSTIC ABSOLUTE POSITION ENCODER AND METHOD

FIELD OF THE INVENTION

This application is related to linear and rotary encoders of the absolute type that track current position of a moving member with respect to a stationary member with the aid of acoustics.

BACKGROUND ART

Many mechanical and metrological applications involving linear and rotary movement of parts or articles transported by mechanical means require supervision. The supervision frequently requires knowledge about the absolute position of these parts or articles. To address this need, many types of absolute position encoders have been developed. In general, they include linear position encoders and rotary shaft encoders. The linear position encoders define absolute linear positions based on movement between a stationary reference and the linearly displaced part. Rotary shaft encoders of the absolute type define an absolute angular position in a similar manner, except for the fact that they track changes in an angle.

Many of the prior art encoders, whether linear or rotary, can also determine a linear or an angular velocity. Additionally, they can determine total distance traveled in linear units (e.g., millimeters) or in angular units (in degrees or radians). Many other useful quantities can be derived from these measured parameters including, for example, angular acceleration.

The demands for accuracy, precision and speed placed on modern encoders have pushed their engineering designers to mainly adapt non-contact measurements enabled by purely electronic, magnetoresistive or optical technologies. For example, many of today's most accurate encoders use the Hall effect (eddy currents) or optical solutions based on shadowing, self-imaging and interference. The electronic approaches, which are also very high performance, typically include inductive and/or capacitive solutions.

For decades now, the fields of linear and rotational motion measurement have been moving away from contact measurements altogether. Even the least problematic contacts, such as brush-type contacts that establish electrical connections, are susceptible to wear and produce some mechanical resistance. Thus, by now, encoders using contacts are not common and can only be found in low-speed applications such as manual volume or tuning controls (e.g., in a radio receiver).

As a result of this trend, there is a dearth of encoders relying on mechanical contact for providing position tracking solutions in applications where lower accuracy measurements of absolute angular and linear position are sufficient. In many applications, however, such lower-performance encoders would be perfectly suitable. Unfortunately, such encoders are not presently available.

OBJECTS OF THE INVENTION

In view of the above shortcomings of the prior art, it is an object of the present invention to provide low-cost linear and angular absolute position encoders relying on acoustics. It is another object of the invention to provide for corresponding methods to acoustically measure linear and angular positions, velocities (motion) and other related quantities.

SUMMARY OF THE INVENTION

Some of the objects and advantages of the invention are secured by an absolute position encoder that has a moving member with a mechanical contacting portion and a stationary member associated with the moving member. At least one, and preferably a number of reed elements or even an entire array of them are mounted on the stationary member such that they can come into mechanical engagement with the mechanical contacting portion of the moving member as the latter one moves. This is done such that the one or more reed elements each generate a certain sound tone, e.g., a sound tone of a certain pitch, in response to transient contact with the contacting portion of the moving member. A receiver is provided for receiving the sound tone or tones. Also, there is an acoustic processing circuit for determining the absolute position from the sound tone or tones.

In one embodiment, the absolute position encoder encodes rotation and the moving member is a shaft. The stationary member is an essentially tubular element, e.g., a pipe, and the reed or reeds are mounted on an inner surface of the tubular element. In this embodiment it is advantageous to position the shaft coaxially with and inside the tubular element. The shaft can be connected to a manipulated element to manipulate the latter with the aid of any suitable mechanism such as an end effector.

When a number of reed elements are present, they are preferably constructed to have differing tensile and/or geometric properties from each other. Thus, transient contact with the mechanical contacting portion as it moves over them generates different sound tones. At the very least, two different sound tones for two different reed elements should be used in this case. Of course, each reed element can be designed by proper choice of tensile properties (e.g., stiffness) and geometry (e.g., length) to generate its own unique sound tone. In addition, the sound tones can be coded in accordance with a suitable code, such as the Gray code, to ensure lower probability of errors in absolute position determination.

In practical applications, the sound tones need to be filtered from acoustic noise. Thus, the acoustic processing circuit is equipped with a filtering arrangement for filtering noise from the sound tone or tones. Preferably, a number of discrete filters are used for this purpose, each assigned to a particular sound tone. Additionally, if required, an amplifier such as a lock-in amplifier can be provided in the acoustic processing circuit for identifying the signal due to the sound tone when high levels of background noise are present.

In some cases, e.g., when operating outdoors where mechanical members are exposed to the influences of wind, temperature variations and other environmental factors, the sound tone or tones will be competing with mechanical modes of one or more such mechanical members. Damping mechanisms can be provided in these situations. These can be mounted on the appropriate member such as the moving member, the stationary member or some other mechanical structure that experiences the interfering mechanical modes.

It is advantageous to deploy the absolute position encoder in conjunction with a feedback system. Thus, at least one mechanical structure can be adjusted in a closed-loop manner based on the absolute position measured acoustically in accordance with the invention.

The receiver can be constructed in accordance with the propagation medium through which the sound tones that are received propagate. In the case of sound tones propagating via the atmosphere (e.g., air) a microphone is a suitable choice. Other elements can be deployed when detecting sound tones propagating through dense media, e.g., one of the mechanical members or still other mechanical structure. Also, sound guides, e.g., small tubes or hoses, can be provided for guiding the sound tones when appropriate.

The invention further extends to methods for encoding absolute position. Such methods call for providing a moving member with a mechanical contacting portion and disposing a stationary member to cooperate with the moving member. At least one reed element is mounted on the stationary member so as to engage with the mechanical contacting portion of the moving member when the latter moves. This is done in such a manner, that the one or more reed elements generate certain sound tones in response to transient contact with the mechanical contacting portion of the moving member. Furthermore, the sound tones are received and the absolute position of the moving member with respect to the stationary member is determined form the sound tone or tones.

In some embodiments, the method is applied in contexts where the moving member rotates. The absolute position determined in these embodiments is an absolute angular position. In some other embodiments, the method is applied in situations where the moving member moves linearly. Therefore, the absolute position recovered in those situations is an absolute linear position.

In practice, it is preferable to process the one or more sound tones by suitable processes, such as filtering, amplification or damping. Also, feedback can be provided for adjusting at least one structural member based on the one or more sound tones.

It is also possible to reverse the construction of any encoder of the invention by placing the reed members on the moving member and the contacting portion on the stationary member. Clearly, the apparatus and methods of invention find many advantageous embodiments. The details of the invention, including its preferred embodiments, are presented in the below detailed description with reference to the appended drawing figures.

BRIEF DESCRIPTION OF THE DRAWING FIGURES

Figure 1:
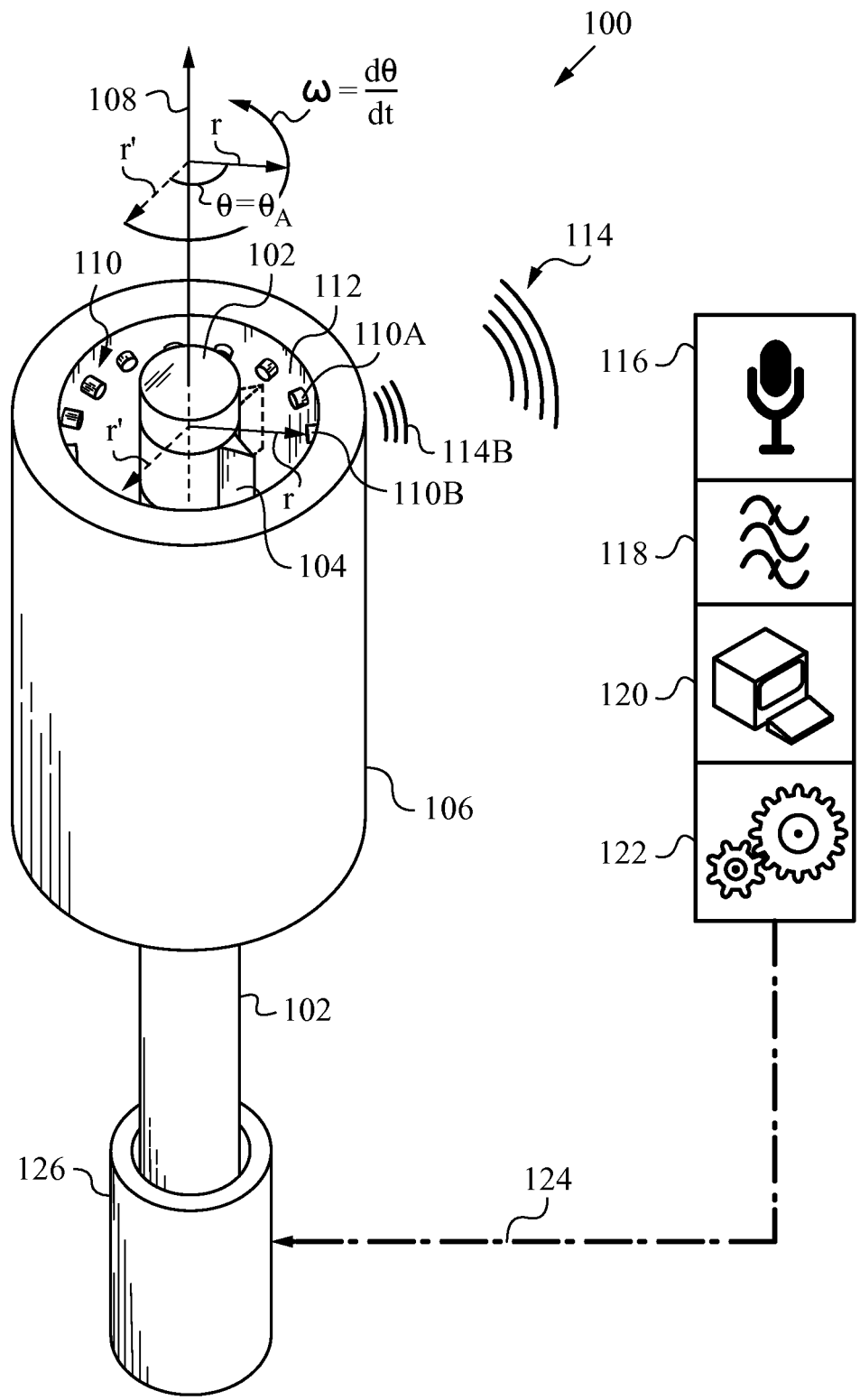
FIG. 1 is a diagram of an acoustic absolute position encoder according to the invention.
Figure 4A:
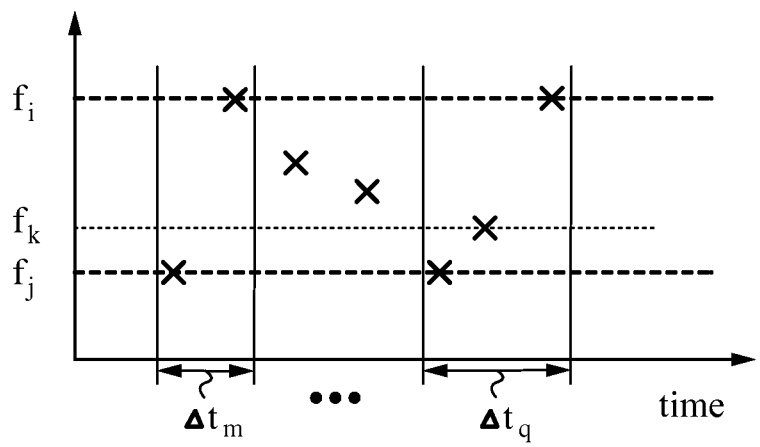
Figure 4B:
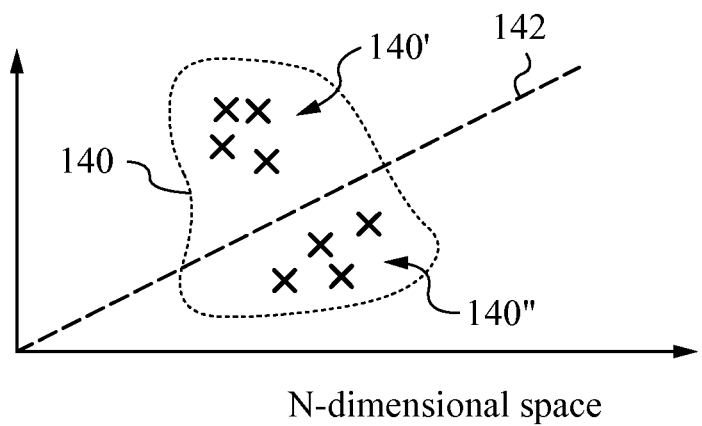
Figure 4C:
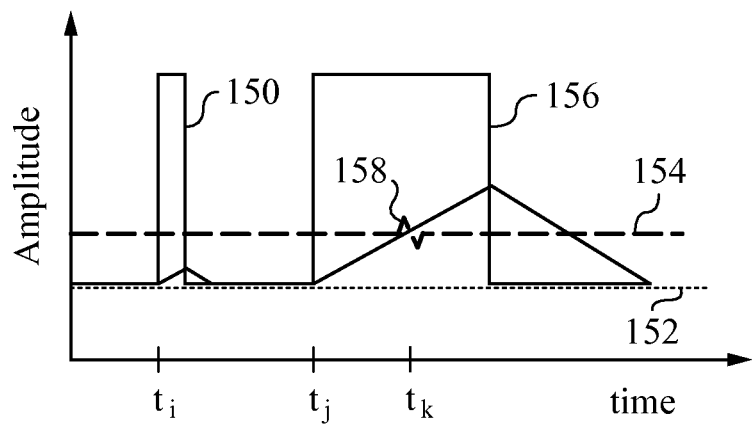

FIGS. 4A-C are graphs illustrating advantageous signal processing and frequency re-use techniques for acoustic position recovery as can be applied to the encoder embodiment of FIG. 1.

Figure 5:
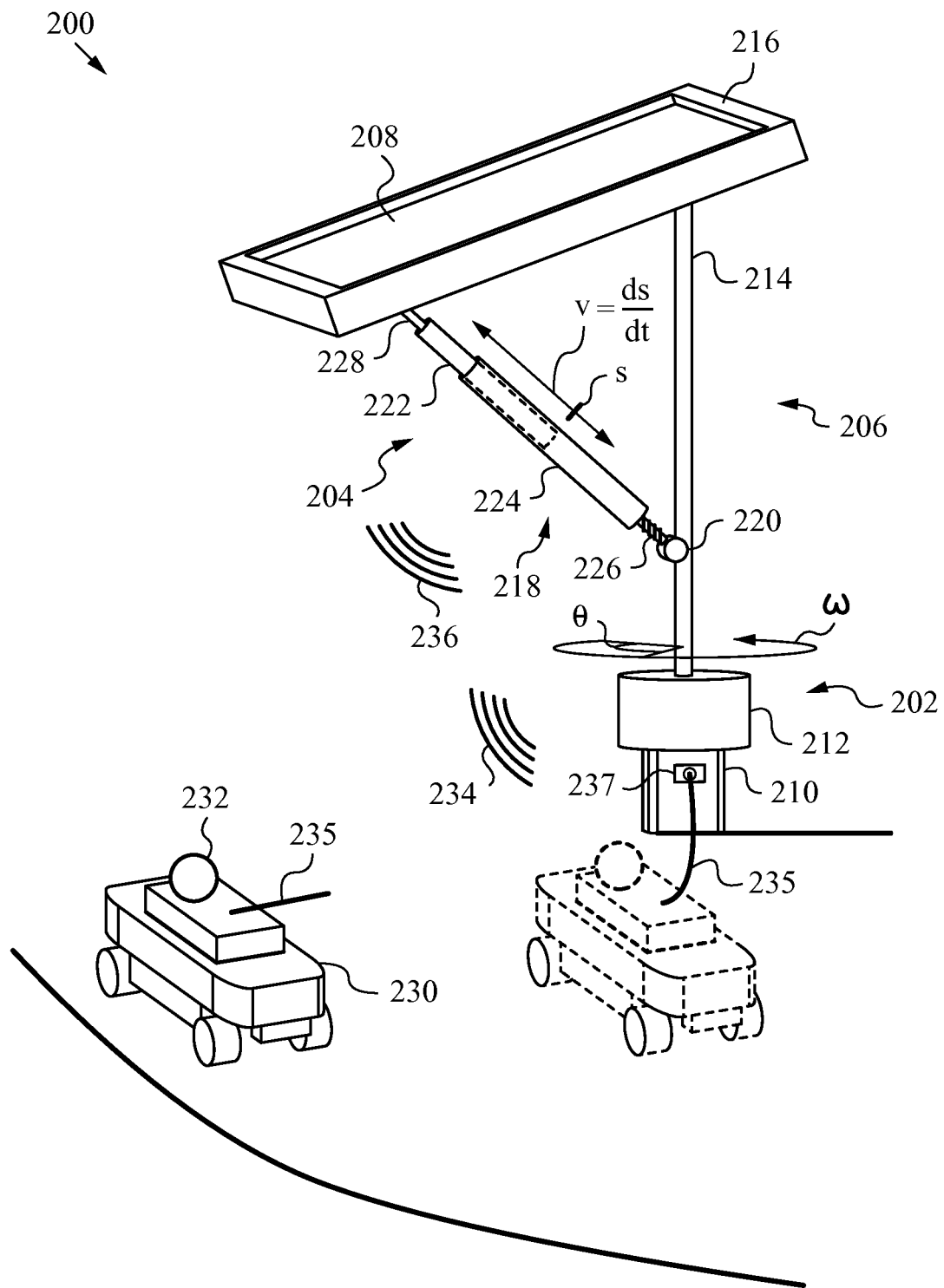

FIG. 5 is a three dimensional view of a system deploying an angular and a linear acoustic absolute position encoder according to the invention.

Figures 6A, 6B:
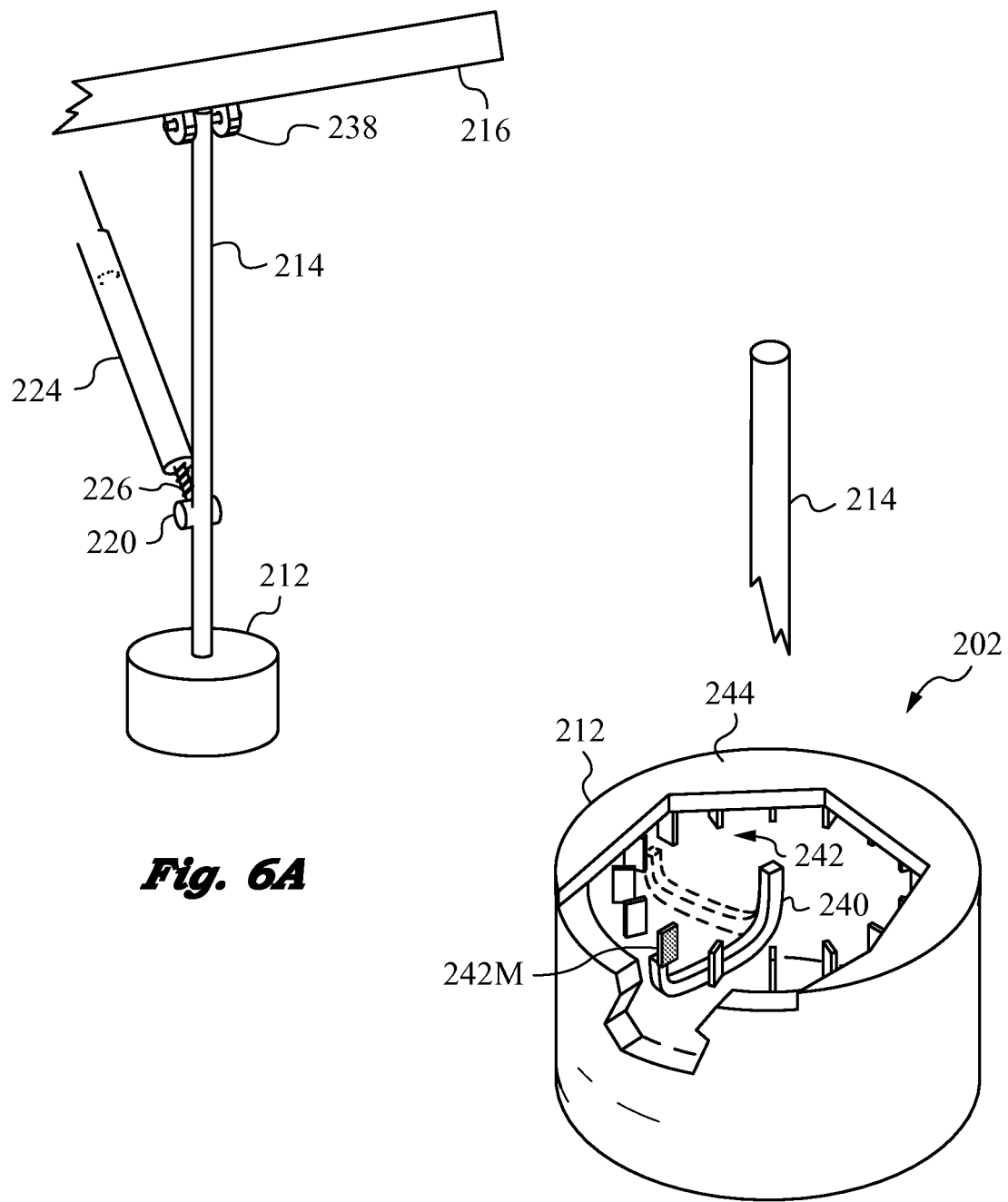

FIGS. 6A-B are three dimensional views showing the details of the absolute angular position encoder used in the system of FIG. 5.

Figure 7A:
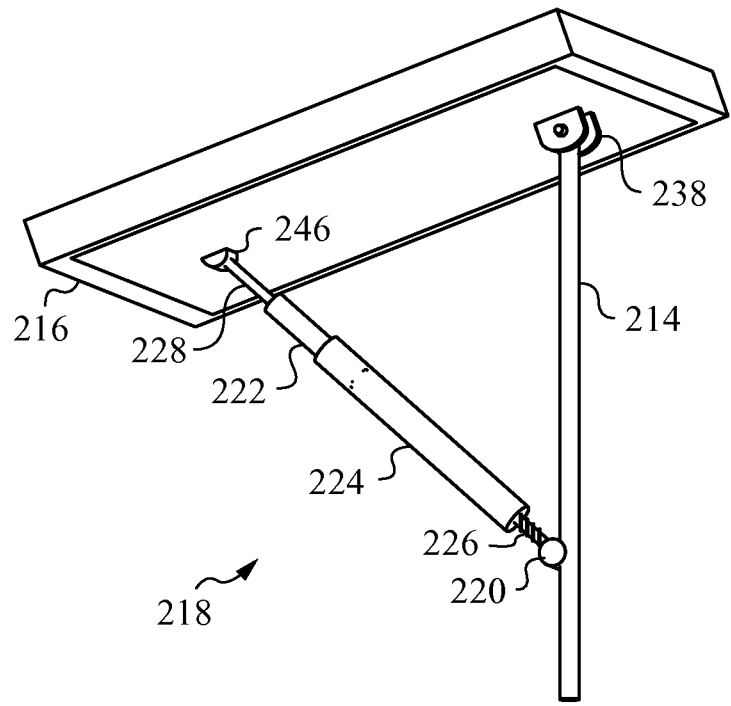
Figure 7B:
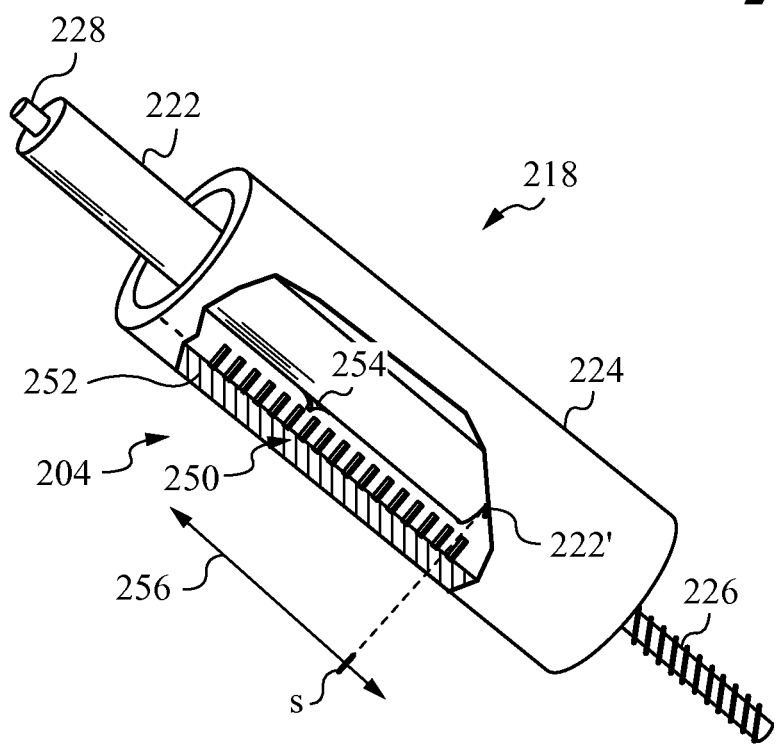

FIGS. 7A-B are three dimensional views showing the details of the absolute linear position encoder used in the system of FIG. 5.

Figure 8:
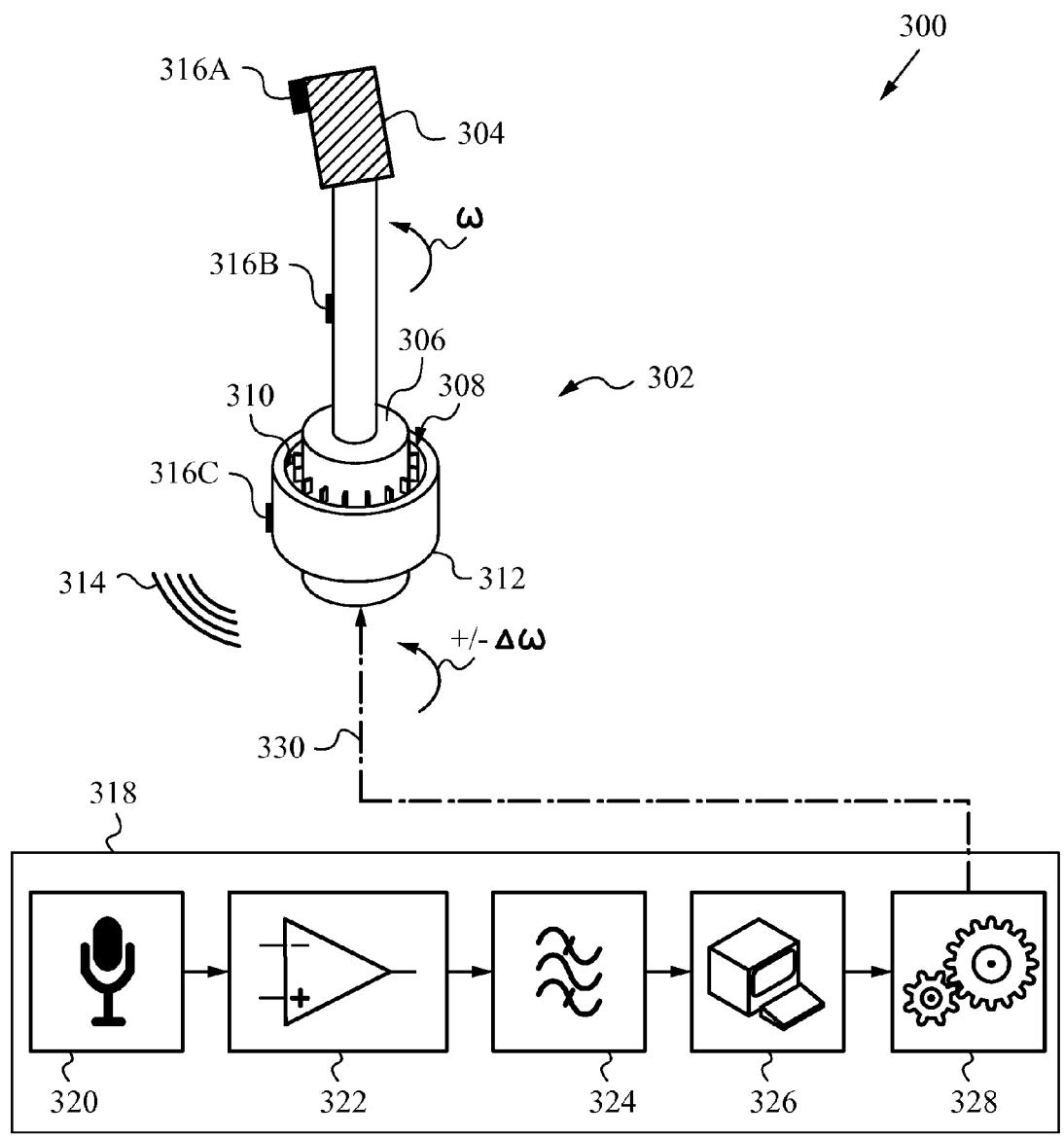

FIG. 8 is a diagram illustrating still another embodiment of an acoustic angular position encoder and method according to the invention.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The present invention will be best understood by first reviewing the embodiment of an acoustic absolute position encoder 100 as shown in FIG. 1. Absolute position encoder 100 has a moving member 102, in this embodiment a shaft, endowed with a projection or mechanical contacting portion 104 that acts as a pin, sometimes also referred to as a "pick" or a tongue. Shaft 102 is preferably made of a mechanically rigid material such as a metal or a metal alloy. Contacting portion 104 is an extension, protrusion or separate part that can be made of the same material as shaft 102 if that material is very rigid, or a different material that is more rigid than the material of shaft 102. For example, contacting portion 104 is made of steel.

Shaft 102 is associated with a stationary member 106. In the present embodiment, stationary member 106 is a tubular element such as a tube or pipe. Pipe 106 is also made of a mechanically rigid material, although this material need not be as rigid as that of contacting portion 104. Still, pipe 106 is quite rigid and preferably not very susceptible to excitations that can produce un-damped mechanical resonant modes. Further, pipe 106 has a circular cross-section defining a center axis 108. Shaft 102 is advantageously positioned or aligned coaxially with pipe 106. In other words, shaft 102 is aligned with center axis 108 of pipe 106.

A number of tines, protruded spring pins or reed elements 110 are mounted circumferentially on an inner surface 112 of stationary member or pipe 106. Reed elements 110 are mounted such that they can engage with contacting portion 104 of moving member 102 as the latter rotates. In the present case, this is accomplished by mounting reed elements 110 such that they directly face contacting portion 104 of moving shaft 102. More specifically, reed elements 110 are firmly fixed in the wall of pipe 106 and positioned such that contacting portion or pick 104 can engage them mechanically or pluck them.

In the present embodiment, each one of reed elements 110 has a generally oval cross-section. Alternatively, reed elements 110 can be rectangular in cross-section and form lamellae or tines. Preferably, reed elements 110 are all made of steel. Also, reed elements 110 protrude into pipe 106 by differing amounts. Thus, the lengths of reed elements 110 differ and thereby contribute to defining different resonant modes for individual reed elements 110.

As is known to those skilled in the art, both the geometry, e.g., length, and tensile properties, e.g., mechanical rigidity or stiffness, dictate the values of resonant modes of reed elements 110. By adjusting the geometry and/or tensile properties such as stiffness, each one of reed elements 110 can be tuned to a particular fundamental resonant mode. The resonant mode, when excited, causes reed elements 110 to produce sound tones 114 whose pitches correspond to the resonant frequencies of their modes. Of course, as is well understood in the art, when excited with sufficient energy, reed elements 110 will also produce harmonics of their resonant frequencies.

In absolute position encoder 100 of FIG. 1, reed elements 110 are adjusted to all have well-defined but different resonant modes. In other words, reed elements 110 are tuned to produce differing sound tones 114 upon mechanical excitation such as can be generated in response to a transient contact or plucking with contacting portion or pick 104 belonging to shaft 102.

A receiver 116 is provided at some distance from pipe 106 for receiving sound tones 114. In the present embodiment, receiver 116 is a simple microphone as sound tones 114 propagate through normal atmosphere, i.e., air. In cases where sound tones 114 do not propagate via the atmosphere, receiver 116 has to be adapted to the propagation medium via which sound tones 114 to be received propagate. Approaches to receiving sound tones 114 propagating in a dense medium, e.g., metal, are known to skilled artisans and additional examples are provided below.

Further, an acoustic processing circuit 118 is connected to microphone 116. Processing circuit 118 is designed for determining an absolute position of shaft 102 in pipe 106 based on sound tones 114 received by microphone 116. For this purpose, processing circuit 118 includes suitable electronic circuitry and filters to distinguish sound tones 114 from typical environmental noise that also propagates through the atmosphere and is received by microphone 116.

Absolute position encoder 100 of FIG. 1 is deployed in conjunction with a feedback system. For this reason, a computing unit 120 is connected to processing circuit 118 to receive the absolute position of shaft 102 in pipe 106 as determined by processing circuit 118. Computing unit 120 is further connected to an adjustment mechanism 122 that is linked by a mechanical connection 124 to a shaft drive 126.

Any suitable mechanical connection 124 that permits adjustment mechanism 122 to control the rotation of shaft 102 about center axis 108 can be used in this embodiment. For example, mechanical connection 124 is a snail drive. It should also be noted that computing unit 120 can be integrated with or even contain adjustment mechanism 122 in embodiments where computing unit 120 is not a general purpose computer but an application-specific unit. Of course, it is possible to also integrate microphone 116 as well as acoustic processing circuit 118 into such an application-specific unit 120.

Due to acoustic noise concerns, both adjustment mechanism 122 and shaft drive 126 in particular, should be as silent as possible. Drive 126 should operate smoothly and avoid exciting any mechanical resonance modes in shaft 102, pipe 106 or any part of any mechanical structure that is coupled to absolute position encoder 100.

The operation of acoustic absolute position encoder 100 will now be explained in reference to FIG. 1 and FIG. 2. Returning initially to FIG. 1, we see that during operation shaft 102 is actuated by drive 126. In particular, drive 126 rotates shaft 102 about center axis 108 of tube 106. The rotation can be continuous or discontinuous, and either clockwise or counter-clockwise. Furthermore, the rotation can be driven at various angular velocities generally designated by $\omega$ and the corresponding circular arrow. Of course, angular acceleration is also permitted and is measured by the time rate of change of angular velocity $\omega$.

Clearly, absolute position encoder 100 is configured to encode absolute angular position of shaft 102 in this embodiment. In other words, absolute position encoder 100 determines an angular position of shaft 102 within tube 106. Quantities such as angular velocity $\omega$, angular acceleration $d\omega/dt$ or still other related quantities (e.g., higher derivatives of angular velocity $\omega$) can be derived from these absolute position measurements.

As shaft 102 rotates, its contacting portion or pick 104 comes into transient contact with fixed reed elements 110 mounted at known angular positions within tube 106. In FIG. 1, pick 104 is shown rotating counter-clockwise to the position indicated in dashed lines. During this rotation, pick 104 comes into transient contact, i.e., plucks, reed element 110B.

As described above, each one of reed elements 110 is tuned to produce a different sound note by proper choice of geometry (length) and tensile properties (stiffness). Therefore, when plucked by pick 104, reed element 110B produces its own characteristic sound tone 114B of a known pitch. Differently put, the presence of specific sound tone 114B among sound tones 114 indicates that reed element 110B is plucked by pick 104 at the time sound tone 114B is generated. This also means that the instantaneous absolute angular position of shaft 102 at the time sound tone 114B is generated must be along the radial vector r.

As will be appreciated by those skilled in the art, there are many ways of actually defining and measuring angular position. In the present case, it is convenient to introduce an angle $\theta$ to parameterize the absolute angular position of shaft 102. Angle $\theta$ is taken to be zero when vector r, which extends from central axis 108 and through the tip portion of pick 104, is in the orientation indicated by dashed arrow r'. Of course, other orientations could also be chosen, e.g., one in which dashed arrow r' is aligned with the "twelve o'clock" mark on a clock dial.

The present parameterization uses pick 104 as a reference to designate absolute position of shaft 102. When reed element 110B is plucked by pick 104, angle $\theta$ is equal to $\theta_A$. Differently put, the instant in time when sound tone 114B with its corresponding pitch is being generated, the time-dependent absolute angular position $\theta(t)$ of shaft 102 is $\theta(t) = \theta_A$. Of course, the time-independent value $\theta = \theta_A$ encodes the absolute angular position of reed element 110B.

Once sound tone 114B is emitted into the atmosphere, it propagates in all directions. One should note, however, that sound tone 114B also propagates through other dense media, such as the material of pipe 106 and of shaft 102. In the present embodiment we are only concerned with the portion of sound tone 114B that propagates via the atmosphere (i.e., air) to be received by microphone 116.

Figure 2:
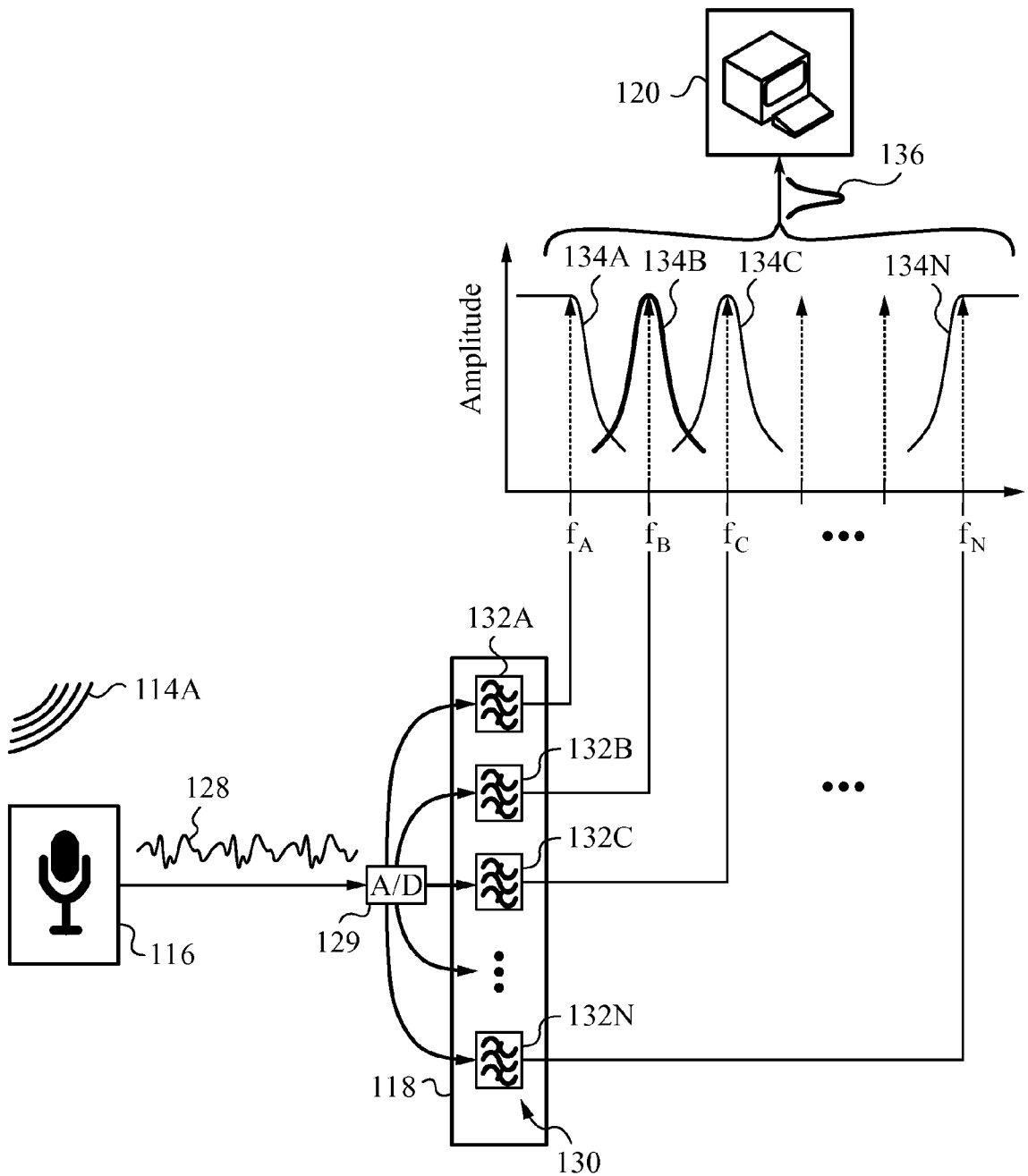
FIG. 2 is a schematic diagram illustrating the processing of sound tones generated by acoustic absolute position encoder of FIG. 1.

FIG. 2 illustrates in a schematic way the processing of sound tones based on the example of sound tone 114B. Microphone 116 receives sound tone 114B along with background acoustic noise (i.e., other sounds). An electric signal 128 corresponding to sound tone 114B as well as the acoustic noise is produced by microphone 116. Then, either microphone 116 or acoustic processing circuit 118 that receives signal 128 converts it from its analog to digital form with the aid of an analog-to-digital (A/D) converter 129.

In this practical situation, sound tone 114B, or more precisely the portion of signal 128 corresponding to it, needs to be filtered from the acoustic noise in signal 128 and/or other sound tones. For this reason, acoustic processing circuit 118 is equipped with a filtering arrangement 130. Filtering arrangement 130 is actually designed to filter sound tones 114 generated by each one of reed elements 110 from each other and from acoustic noise.

Preferably, filtering arrangement 130 deploys a number N of discrete filters 132A, 132B, . . . , 132N for this purpose. Each one of the N discrete filters 132A, 132B, . . . , 132N is assigned to a particular sound tone from among sound tones 114. When sound tones 114 of each one of reed elements 110 are unique the number N is also the total number of reed elements 110. It should be noted, however, that under some circumstances one can use fewer sound tones 114, i.e., some sound tones 114 can be generated by two or more reed elements 110 (i.e. N is less than the number of reed elements 110). Encodings that re-use some or all sound tones 114 can be advantageous in certain applications and will be addressed in more detail below.

In our example, discrete filter 132B is assigned to pick out from signal 128 the portion that corresponds to sound tone 114B generated by reed element 110B. Thus, a pass-band 134B of discrete filter 132B is centered on the fundamental frequency $f_B$ of sound tone 114B that is duly received by microphone 116 and reproduced in signal 128. Similarly, other pass-bands 134A, 134C, . . . , 134N are centered on fundamental frequencies $f_A$, $f_C$, . . . $f_N$ of the other reed elements 110. In cases where excessive noise is not expected, filters 132A and 132N may be instantiated by low- and high-pass filters instead of pass-band filters. Note that this is the case shown in the present embodiment.

The output of acoustic processing circuit 118 is a signal 136 that corresponds to original sound tone 114B. Signal 136 is free of noise. It represents the absolute angular position of shaft 102 in terms of angle θ at the time sound tone 114B was generated. To retain temporal information about angular position of shaft 102, angle θ is reported along with the time it was recovered from the acoustic measurement. Preferably, this is done by reporting θ to computing unit 120 as a function of time or θ(t).

Once computing unit 120 receives signal 136 along with the time information, it can further process it and deploy it for other functions. Of course, during operation computing unit 120 receives a succession of signals 136 corresponding to the sequence of sound tones 114 produced by position encoder 100. This sequence is represented by values $\theta(t_1)$, $\theta(t_2)$, $\theta(t_3)$ . . . indicative of the instantaneous angular positions of shaft 102 at corresponding times $t_1$, $t_2$, $t_3$, . . . . From the sequence, computing unit 120 can recover the absolute rotational motion of shaft 102.

In practical situations, shaft 102 may rotate rapidly. Thus, computing unit 120 preferably first accounts for time delays in the recovered values $\theta(t_1)$, $\theta(t_2)$, $\theta(t_3)$ . . . . It does so by compensating for sound propagation time delays when the distance between microphone 116 and encoder 100 is known. Further, it also compensates for any electronic processing delays if these are significant enough to introduce errors.

After introducing appropriate compensations, unit 120 can compute from the sequence of corrected values $\theta(t_1)$, $\theta(t_2)$, $\theta(t_3)$ . . . the angular velocity ω of shaft 102. Note that angular velocity ω is the first order time derivative of the function of θ(t) otherwise expressed as ω=dω/dt. Since only a succession of values $\theta(t_1)$, $\theta(t_2)$, $\theta(t_3)$ . . . rather than a continuous function of θ(t) are available to unit 120, the computed value of angular velocity ω may not always be accurate. The same is true for other quantities or parameters of motion derived from the sequence of values $\theta(t_1)$, $\theta(t_2)$, $\theta(t_3)$ . . . , such as, for example, the shaft's 102 angular acceleration dω/dt.

In a preferred embodiment, computing unit 120 also uses the succession of values $\theta(t_1)$, $\theta(t_2)$, $\theta(t_3)$ . . . for control functions, as will be better seen by referring back to FIG. 1. One useful control function implemented by unit 120 is an adjustment of the absolute angular position, i.e., angle θ, of shaft 102. To perform this function, unit 120 issues a corresponding control signal to adjustment mechanism 122. In turn, mechanism uses mechanical connection to adjust angle θ of shaft 102 with shaft drive 126.

A person skilled in the art will realize that many control signal techniques can be applied to ensure that the adjustment process is efficient and effective. This is especially important given some sequences of values $\theta(t_1)$, $\theta(t_2)$, $\theta(t_3)$ . . . and the rather limited angular resolution that even densely spaced reed members 110 can afford.

In fact, given the coarse nature of absolute angular position measurements obtained with acoustic encoder 100, additional provisions may be required, depending on the application. Note first, that the angular resolution of encoder 100 is satisfactory for reed members 110 spaced at 10° increments Δθ (Δθ=10°). However, when their spacing is denser, e.g., at Δθ=5°, temporal vs. frequency resolution becomes a challenge.

Practical embodiments can use frequencies extending from about 200 Hz to about 2 kHz, inclusive. For example, 19 frequencies that are logarithmically spaced can be chosen. One exemplary set of frequencies starting with 200 Hz and spanning the entire range is as follows: 200 Hz, 227 Hz, 258 Hz, 294 Hz, 334 Hz, 379 Hz, 431 Hz, 490 Hz, 557 Hz, 632 Hz, 719 Hz, 817 Hz, 928 Hz, 1,055 Hz, 1,119 Hz, 1,363 Hz, 1,549 Hz, 1,760 Hz and 2,000 Hz. It should be noted that the second and third harmonics of these frequencies will avoid falling on these 19 prescribed frequencies, thus providing for easier filtering and more reliable performance.

Figures 3A, 3B:
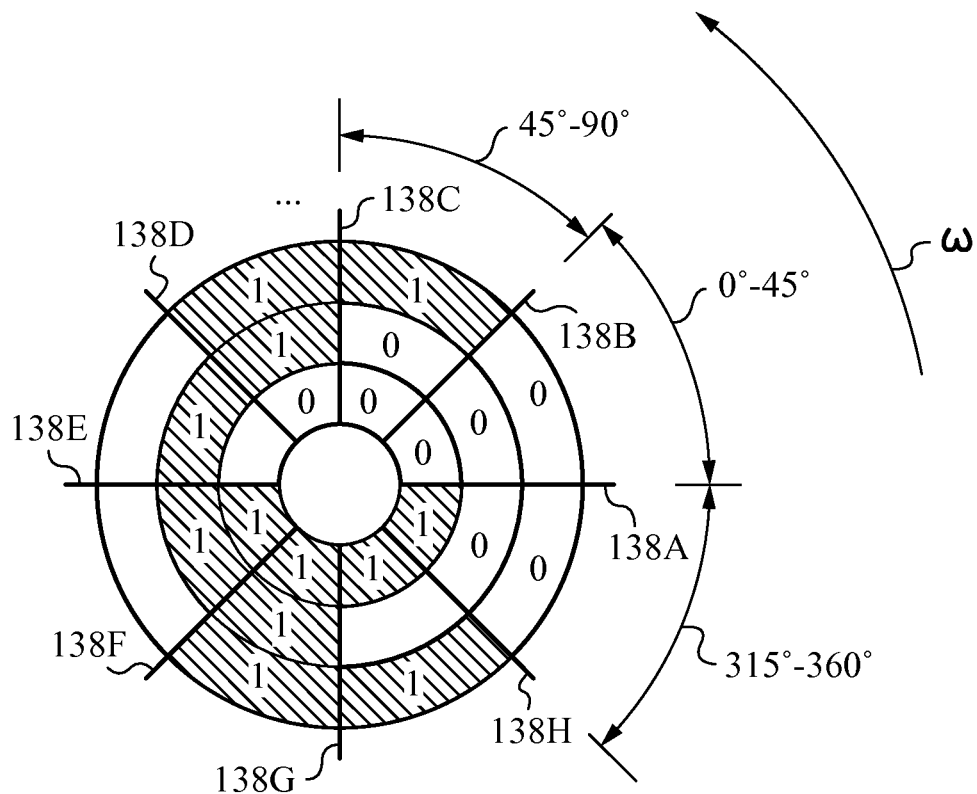
FIG. 3A is a chart diagram showing an advantageous manner of encoding sound tones using Grey code.
FIG. 3B is a table illustrating Gray code assignments in FIG. 3A.

FIG. 3A is a chart diagram illustrating one advantageous additional provision, namely a manner of encoding sound tones 114 of reed members 110 using Gray codes. For further information about Gray codes the reader is referred to U.S. Pat. No. 2,632,058 to Frank Gray.

In the present example, the angle θ indicating the absolute angular position of shaft 102 is broken up into 45° increments. (Note that the value of θ can range from 0° to 360° or 2π radians.) There are a total of eight 45° increments in angle θ over 360° with each increment Δθ=45°. Correspondingly, eight reed members 110 are required in this case. Of course, denser spacing can be implemented with sixteen reed elements 110 (22.5°) and even denser with thirty two or sixty four reed elements 110 (11.25° and 5.625°). Gray codes for such 8-bit, 16-bit, 32-bit, 64-bit and still higher bit codes are well known to those skilled in the art.

Now, the embodiment of FIG. 1 has sixteen reed elements 110. In contrast, FIG. 3A shows the circumferential positions of just eight reed elements 110. This is done for clarity. It will be appreciated by those skilled in the art that a 16-bit Gray code can be applied in the embodiment of FIG. 1. Also, as mentioned above, 19 reed elements 110 can be used to implement the logarithmically spaced frequencies described above. Those 19 frequencies and in fact any number of reed elements other than the binary sequence 8, 16, 32, 64, 128 etc. can also be Gray coded.

The positions of reed elements 110 are indicated on the chart in FIG. 3A with demarcations 138A, 138B, . . . , 138H at 0° (360°), 45°, 90°, . . . , 315°, respectively. Now, the sound tones of reed elements 110 at demarcations 138A, 138B, . . . , 138H encode the 8-bit values shown in the eight sectors (octants) in the clockwise direction. Thus, reed element 110A at 138A produces sound tone 114A representing the 8-bit binary value "000", reed element 110B at 138B produces sound tone 114B representing the 8-bit binary value "001", the next one produces sound tone 114C representing "011" and so forth. In fact, FIG. 3B shows the full assignment table for 8-bit assignment of Gray codes in the embodiment of FIG. 3A.

We first consider the case where angular velocity ω is known to be counter-clockwise. This can be ensured, for example, with proper construction of drive 126 or other mechanical provisions well-known to those skilled in the art.

In case of assured counter-clockwise rotation, sound tone 114A associated with demarcation 138A indicates rotation of shaft 102 (see FIG. 1) into the 0°-45° octant from the 315°-360° octant. Next sound tone 114B associated with demarcation 138B indicates rotational movement of shaft 102 into the 45°-90° octant. Similarly, the remaining sound tones 114C-H signal transition into successive octants.

It is important to note that from one octant to the next, Gray codes ensure that the values of corresponding sound tones 114 change in one single bit. The use of Gray codes in prior art shaft encoders is well documented. In fact, any known techniques, including those for tracking unrestricted clockwise and counter-clockwise rotations with Gray coding can be adopted for encoding sound tones 114 generated by encoder 100.

In some embodiments, the number of frequencies chosen is a prime number. In those embodiments it particularly easy to re-use frequencies. This is done by assigning unique frequencies to neighboring pairs of reed elements 110.

In fact, FIG. 4A is a graph that illustrates how two different frequencies $f_i$, $f_j$ re-assigned among reed elements 110, can encode different positions depending on whether they are heard in succession (adjacent) or not. During a time window $\Delta t_m$, frequencies $f_i$, $f_j$ are indeed heard in succession without any intervening frequencies (i.e., no intervening sound tones 114). The next time, however, during time window $\Delta t_q$ frequencies $f_i$, $f_j$ do not succeed each other. Instead, frequency $f_k$ is registered between them. Thus, computing unit 120 can differentiate the first angular position during time window $\Delta t_m$ from the second angular position during time window $\Delta t_q$ despite the re-use of frequencies $f_i$, $f_j$ by corresponding reed elements 110.

Another approach to frequency re-use can be deployed by a system of $n*((n-1)/2)$ reed elements 110 that have unique pairings, such as, for example: 1234567, 2461357, 3625147, . . . .

Such pairings are constructed by first counting in modulo 1 to yield a frequency difference of 1 unit between nearest neighbors. Then counting in modulo 2 for a frequency difference of 2. After than in modulo 3 and so on until reaching (n−1)/2. These counts produce symmetric number sequences that are unique. Now, absolute position can be quickly inferred by listening to any reed element 110i and then its neighboring reed element 110j and determining absolute position from their frequency difference (i.e., whether it is 1, 2, 3 etc.).

In case of uncertainty as to which frequencies are heard by microphone 116, a Markov chain can be constructed to account for the uncertainty. The Markov approach will produce a certainty level for each position and can thus be used to bound erroneous position estimates. The probabilities for the Markov chain will vary greatly between different implementations, and sometimes even in a single system. Thus, it is advantageous to train the probabilities by attaching a relative encoder in series with absolute acoustic encoder 100 and performing statistical analysis on states that are branched in the Markov chain, and ones that are true. The subject of Markov chains and appropriate implementations is discussed in great detail in the prior art. The reader is referred to Kishor S. Trivedi, *Probability and Statistics with Reliability, Queueing, and Computer Science Applications*, John Wiley & Sons, Inc. New York, 2002. ISBN 0-471-33341-7 and to Stuart Russell, Peter Norvig, *Artificial Intelligence: A Modern Approach*, Prentice Hall, December 2009, ISBN: 0136042597 for further information.

Furthermore, specific unique frequencies, especially those in the lower band, as these propagate through solid materials with ease, should be reserved for the needs near the travel limits of encoder 100. Thus, any mechanisms deploying encoder 100 can be more certain when there is a danger of striking the edge of the workspace defined by the encoder's 100 angular position.

Another advantageous provision to reduce errors involves appropriate signal processing, as explained with further reference to the graphs in FIGS. 4B-C. Because of the error-prone nature of the recovery of sound tones 114, it is preferable to adopt robust signal analysis techniques in acoustic position recovery. Some of these will now be explained as applied to encoder 100 embodiment of FIG. 1, but it will be understood by those skilled in the art that analogous techniques can be applied to diverse embodiments of acoustic encoders as taught by the instant invention.

FIG. 4B is a graph illustrating the treatment of samples 140 of signal 136 (see FIG. 2) collected during positive sound tone 114B. The graph of FIG. 4B assigns a dimension to each of the discrete filters 132A, 132B, . . . , 132N and is thus an N-dimensional space representation of samples 140. Now, a number of samples 140 that are collected and delivered to computing unit 120 represent signal samples 140' and a number of them represent noise samples 140". To differentiate between them, we use a hyperplane 142 obtained through a test-train process.

First, signal 136 is fed into discrete pass-band filters 132A, 132B, . . . , 132N. These are tuned to the same set of frequencies, namely $f_A$, $f_B$, $f_C$, . . . , $f_N$ to which reed elements 110A-N are tuned. For smaller embedded systems, the Goertzel algorithm is recommended due to its light computation requirements. Compared to other techniques, such as the Fast Fourier Transform, Goertzel only computes the response at the same frequencies as our reeds. For each incoming sample, Goertzel only requires one multiplication, one addition, and one subtraction to perform the analysis. For further information, the reader is referred to Chen, Chiouguey J. (June 1996), *Modified Goertzel Algorithm in DTMF Detection Using the TMS320C80 DSP*, Application Report, SPRA066, Texas Instruments.

The output amplitudes of each pass-band filter 132A-N are concatenated into an N-dimensional vector. Computing unit 120 can deploy Support Vector Machines (SVM), a well-known machine learning algorithm, to take training data and formulate half-spaces between the various frequencies. Since SVMs are binary classifiers, we only produce SVMs between neighboring frequencies, e.g., between $f_B$ and $f_C$. For additional teachings about Support Vector Machines, the reader is referred to Press, William H.; Teukolsky, Saul A.; Vetterling, William T.; Flannery, B. P. (2007). "Section 16.5. Support Vector Machines". *Numerical Recipes: The Art of Scientific Computing* (3rd ed.). New York: Cambridge University Press. ISBN 978-0-521-88068-8.

It is now clear, that FIG. 4B shows a single SVM (corresponding to single hyperplane 142) separating test data 140 from two different frequencies (samples 140' being at one frequency and samples 140" being at a different frequency). It is also advantageous to create a single SVM that separates samples 140" corresponding to ambient noise from sound tones 114 corresponding to samples 140' that originate from excitations of reed elements 110.

FIG. 4C illustrates a technique for rejecting a spurious signal 150. If at an instant in time $t_i$, a signal is seen, in this case spurious signal 150, a counter counts up. Otherwise, when no signal is present or the signal terminates, the counter counts down until it reaches a lower bound 152. Thus, counter creates a ramp up that is coincident with the commencement of any signal.

Now, if the counter exceeds a threshold 154 while a signal persists, then the corresponding signal is long enough to be considered stable. This is the case for signal 156 that starts at time $t_j$, but not for signal 150. Thus, signal 150 is rejected as spurious by computing unit 120. For better visualization, time $t_k$ when threshold 154 is reached by the counter during signal 156 is marked by 158.

FIG. 5 is a three dimensional view of a system 200 deploying an absolute angular position encoder 202 and an absolute linear position encoder 204 according to the invention. In the present example, encoders 202, 204 are integrated in a mechanical structure 206 designed for adjusting the orientation of a solar surface 208.

Mechanical structure 206 has a ground post 210 that anchors it firmly in the ground. A housing 212 on post 210 contains angular position encoder 202. Encoder 202 is designed to track the angular position of a vertical shaft 214 that extends vertically from housing 212 and supports a frame 216 that holds solar surface 208. Specifically, encoder 202 tracks angle θ, which parameterizes the angular position, and angular velocity ω of vertical shaft 214 as it rotates solar surface 208 in azimuth angle. Any suitable drive mechanism can be employed to rotate vertical shaft 214.

Linear position encoder 204 is integrated with a lateral support beam 218 that is connected to frame 216 for controlling the elevation of solar surface 208. Beam 218 is connected at its proximal end to vertical shaft 214 by a joint 220. Linear position encoder 204 tracks a linear position s and velocity v (v=ds/dt) of an inner case 222 within an outer case 224. Notice that it is the end of inner case 222 within outer case 224 that is used by linear encoder 204 to measure absolute linear position.

A lead screw 226 and a distal shaft 228 connect lateral beam 218 to frame 216 and joint 220, respectively. Rotation of lead screw 226 provides the linear motion in lateral support beam 218. This rotation is controlled by any suitable drive mechanism.

System 200 employs a mobile robot 230 to interact with structure 206. Robot 230 houses the required elements to enable the operation of both angular and linear position encoders 202, 204. In other words, robot 230 is equipped with a receiver 232 for receiving sound tones 234 from angular position encoder 202 and for receiving sound tones 236 emitted by linear position encoder 204.

Furthermore, robot 230 has an acoustic processing circuit, a computing unit and an interface 235 for engaging with structure 206. As shown in dashes, robot 230 deploys interface 235 to engage via dock 237 located in ground post 210. Once engaged, it can adjust the angular position θ and linear position s of vertical and lateral shafts 214 and 218 respectively. The elements inside robot 230 can be analogous to those shown in the embodiment of FIG. 1 and are not shown in FIG. 5 for reasons of clarity.

FIGS. 6A-B are three dimensional views showing the details of absolute angular position encoder 202 tracking the rotation of vertical shaft 214 used by system 200. FIG. 6A is a partial three dimensional view that shows how vertical shaft 214 is attached to frame 216 by a joint 238. Joint 238 only permits a change in elevation angle of frame 216 and is insensitive to tilt. Otherwise, joint 238 ensures that any rotation in azimuth angle by vertical shaft 214 is imparted directly to frame 216.

FIG. 6B illustrates in more detail the operation of angular position encoder 202 inside housing 212. For clarity, a portion of housing 212 is presented in a cut-away view to expose encoder 202. We thus see that encoder 202 is connected to vertical shaft 214 (connection not explicitly shown in FIG. 6B for reasons of clarity) that serves as the moving member of encoder 202. Attached to vertical shaft 214 within housing 212, which serves as the stationary member of encoder 202, is a mechanical contacting member 240. Member 240 is in the form of an upwardly curved tongue in the present embodiment.

An angular array of acoustic reed elements 242 is mounted within housing 212 on the interior surface of its upper cover 244. Reed elements 242 are mounted such that they all face the upturned end of tongue 240. At the time shown, reed element 242M is about to be contacted or plucked by tongue 240 to generate its corresponding sound tone.

FIGS. 7A-B are three dimensional views showing the details of absolute linear position encoder 204 tracking the linear displacement of inner case 222 within outer case 224. FIG. 7A is a partial three dimensional view that shows how lateral shaft 218 is attached to frame 216 by an end effector 246. In particular, end effector 246 is located at the end of distal shaft 228 belonging to lateral shaft 218. Thus, lateral shaft 218 is connected to frame 216, which represents a manipulated element, to manipulate it with the aid of any suitable mechanism of which end effector 246 is merely an example. In the present case, the manipulation involves a change in elevation dictated by the location of inner case 222 within outer case 224. End effector 246 is insensitive to other displacements or rotations, e.g., tilt.

We now turn to FIG. 7B, which contains a partial three dimensional view of lateral shaft 218 with a cut-away portion to expose the parts of linear encoder 204. A linear array of reed elements 250 in mounted on inner side wall 252 of outer case 224. Reed elements 250 are designed to engage with a mechanical contacting portion 254 on inner case 222, which is the moving member in this embodiment.

Now, as lead screw 226 is turned by a drive to adjust the elevation angle, inner case 222 moves with respect to stationary outer case 224. This movement is linear, as indicated by arrow 256. Moreover, the instantaneous absolute linear position of inner case 222 is measured in reference to its distal end 222'. At the present time, distal end 222' of inner case 222 is at position s, also indicated on arrow 256. Of course, for the purposes of adjusting the elevation angle, position s can be related to the value of the elevation angle of frame 216.

The present apparatus and method admit of many alternative embodiments. For example, in system 200 of FIG. 5, sound tones for either or both absolute angular position encoder 202 and absolute linear position encoder 204, especially sound tones at lower frequencies, may be transmitted to mobile robot 230 through mechanical structure 206 itself. Thus, on-board receiver of robot 230 couples to mechanical structure 206 in this alternative embodiment. In this case, interface 235 may include a suitable pick-up element, such as a piezo-sensor that can pick up sound tones from encoders 202, 204 propagating through structure 206 directly.

Of course, coupling directly to moving or stationary members of encoders 202, 204 to pick up sound notes propagating through them is also possible. In those situations appropriate taps can be placed on corresponding members of encoders 202, 204 and their outputs connected to port 237.

Alternatively, interface 235 can include or even itself be a small hose or sound tube that acts as a sound guide. In this case, port 237 can provide an air connection to transmit sound tones from the cavity in housing 212 and from the cavity between inner and outer casings 222, 224 to sound tube 235.

Another encoder construction and its method of operation in accordance with the invention are shown in the diagram of FIG. 8. Here, a system 300 employing an acoustic angular absolute position encoder 302 is configured to adjust the position of a mechanical structure which is here as simple mechanical member 304. Member 304 is mounted on top of a shaft 306, which is also the moving member of encoder 302.

The internal construction of encoder 302 is reversed in comparison to the prior embodiments. Specifically, a number of reed elements 308 are mounted on the moving member or shaft 306. A contacting portion or tongue 310 is located on stationary member 312. The actual operation of encoder 302 is analogous to the previously described embodiments. Namely, sound tones 314 from individual reed elements 308 are generated when tongue 310 engages or plucks them during its rotary motion. The angular velocity ω of shaft 306 is indicated by a circular arrow.

System 300 operates outdoors where all mechanical members as well as member 304 are exposed to the influences of wind, temperature variations and other environmental factors. Thus, sound tones 314 have to compete with mechanical modes of mechanical members 306, 312 and member 304 that are excited by the environmental factors and generate acoustic noise.

To combat this challenge, damping elements 316A, 316B and 316C are placed on member 304, and on mechanical members 306, 312. Elements 316A, 316B and 316C dampen or attenuate the interfering mechanical modes excited by environmental factors.

System 300 has a remote unit 318, which houses a receiver 320, an amplifier 322, a filtering arrangement 324, a computing unit 326 and a feedback control 328. Remote unit 318 can be mobile, e.g., as in the case of the mobile robot discussed above, or it can be stationary. Note that when unit 318 is stationary and the distance to encoder 302 is known, the propagation time delay of sound tones 314 can be compensated for.

Receiver 320 receives sound tones 314. Because of the low signal-to-noise ratio due to environmental factors, receiver 320 forwards its signal to amplifier 322 for amplification. Preferably, when frequency and phase information about sound tones 314 is available, amplifier 322 is a lock-in type to more efficiently lift the signal portion corresponding to sound tones 314 out of the high levels of background noise.

The signal recovered by amplifier 322 is then sent to filtering arrangement 324, which can include a separate bandpass filter for each frequency, as previously described. Thereafter, the signal is processed by computing unit 326. It should be noted, that any of the above-taught techniques can be deployed by unit 326 to determine the angular position of shaft 306 based on recovered sound tones 314.

Finally, the angular information from unit 326 is sent to feedback control 328. Control 328 allows system 300 to operate in closed-loop manner. Specifically, an appropriate mechanical connection 330, which includes a drive, is used to correct the angular position or velocity ω of shaft 306. In the case shown, control 318 uses mechanical connection 330 to correct the angular velocity by an appropriate correction factor $+/-\Delta\omega$.

The methods for encoding absolute position that use a moving member with a mechanical contacting portion and disposing a stationary member to cooperate with the moving member admit of many other embodiments. Furthermore, in addition to filtering, amplification or damping other measures can be deployed to recover good signals and permit accurate control. For example, the harmonics of the sound tones can be taken advantage of for additional cross-check and error control, rather than being discarded.

The method of invention requires supervised learning to determine probabilities from transitions. This is required of every installation, since environmental factors will alter probabilities, even if identical installations are created in differing locations. As a result, every embodiment of the invention will require a training of probabilities. For example, one location might be very windy or another location might have been installed with a different supporting foundation that creaks from thermal cycling. The training allows the system to be robust to unforeseen conditions. In some situations, a method to increase robustness against system changes (such as detuning of reed elements) or changes in ambient conditions (such as wind noise from an increase in storm activity) involves recording of samples of full acoustic data. This can be done on-board the mobile robot or at a central server. The purpose is to re-learn the new reed element sound tones (changes in pitch). This can be done effectively by using Fourier transforms and thus support new support vector machines, thereby allowing the system to be robust against long-term and potentially unforeseen changes.

As a method of reducing high-frequency overtones (harmonics) generated by reed elements, one can create pairs of reeds that are in close proximity to each other. In this case, only one reed element is plucked by the tongue. However, the pair of reed elements creates a tuning fork that greatly reduces overtone generation.

In view of the above teaching, a person skilled in the art will recognize that the apparatus and methods of invention can be embodied in many different ways in addition to those described without departing from the spirit of the invention. Therefore, the scope of the invention should be judged in view of the appended claims and their legal equivalents.

I claim:

1. An absolute angular position encoder comprising:
    a) a rotary moving member having a mechanical contacting portion;
    b) a stationary member associated with said moving member;
    c) at least one reed element mounted on said stationary member to enable engagement with said mechanical contacting portion such that said at least one reed element generates a predetermined sound tone in response to transient contact with said mechanical contacting portion;
    d) a receiver for receiving said predetermined sound tone; and
    e) an acoustic processing circuit for determining said absolute angular position from said sound tone.

2. The absolute angular position encoder of claim 1, wherein said moving member comprises a shaft.

3. The absolute angular position encoder of claim 2, wherein said stationary member is an essentially tubular element and said at least one reed is mounted on an inner surface of said essentially tubular element.

4. The absolute angular position encoder of claim 3, wherein said shaft is mounted coaxially with said essentially tubular element, and said shaft is further connected to a manipulated element.

5. The absolute angular position encoder of claim 1, wherein said at least one reed element comprises a number of reed elements having differing properties such that transient contact with said mechanical contacting portion generates different predetermined sound tones for at least two reed elements belonging to said number of reed elements.

6. The absolute angular position encoder of claim 5, wherein said different predetermined sound tones are encoded.

7. The absolute angular position encoder of claim 1, wherein said acoustic processing circuit comprises a filtering arrangement for filtering noise from said predetermined sound tone.

8. The absolute angular position encoder of claim 7, wherein said filtering arrangement comprises a number of discrete filters.

9. The absolute angular position encoder of claim 7, wherein said acoustic processing circuit further comprises a lock-in amplifier for amplifying said sound tone.

10. The absolute angular position encoder of claim 1, further comprising a damping mechanism for damping mechanical modes of one or more mechanical members.

11. The absolute angular position encoder of claim 10, wherein said one or more mechanical members belong to the group consisting of said moving member, said stationary member and a mechanical structure.

12. The absolute angular position encoder of claim 1, wherein said receiver comprises a microphone for receiving said predetermined sound tone propagating via the atmosphere.

13. The absolute angular position encoder of claim 1, further comprising a sound guide for said predetermined sound tone.

14. A method for encoding absolute angular position comprising:
a) providing a rotating moving member with a mechanical contacting portion;
b) disposing a stationary member to cooperate with said moving member;
c) mounting at least one reed element on said stationary member to enable engagement with said mechanical contacting portion, such that said at least one reed element generates a predetermined sound tone in response to transient contact with said mechanical contacting portion;
d) receiving said predetermined sound tone; and
e) determining said absolute angular position of said moving member with respect to said stationary member from said predetermined sound tone.

15. The method of claim 14, further comprising processing said predetermined sound tone with at least one process selected from the group consisting of filtering, amplification and damping.

16. An absolute angular position encoder comprising:
a) a moving member;
b) a stationary member associated with said moving member and having a mechanical contacting portion;
c) at least one reed element mounted on said moving member to enable engagement with said mechanical contacting portion such that said at least one reed element generates a predetermined sound tone in response to transient contact with said mechanical contacting portion;
d) a receiver for receiving said predetermined sound tone; and
e) an acoustic processing circuit for determining said absolute angular position from said sound tone.

17. An absolute position encoder comprising:
a) a moving member having a mechanical contacting portion;
b) a stationary member associated with said moving member;
c) at least one reed element mounted on said stationary member to enable engagement with said mechanical contacting portion such that said at least one reed element generates a predetermined sound tone in response to transient contact with said mechanical contacting portion;
d) a receiver for receiving said predetermined sound tone;
e) an acoustic processing circuit for determining said absolute position from said sound tone; and
f) a feedback system for adjusting at least one mechanical structure based on said absolute position.

18. A method for encoding absolute position comprising:
a) providing a rotating moving member with a mechanical contacting portion;
b) disposing a stationary member to cooperate with said moving member;
c) mounting at least one reed element on said stationary member to enable engagement with said mechanical contacting portion, such that said at least one reed element generates a predetermined sound tone in response to transient contact with said mechanical contacting portion;
d) receiving said predetermined sound tone;
e) determining said absolute position of said moving member with respect to said stationary member from said predetermined sound tone; and
f) providing a feedback for adjusting at least one structural member based on said predetermined sound tone.

\* \* \* \* \*